United States Patent Office 2,803,624
Patented Aug. 20, 1957

2,803,624
METAL-CONTAINING POLYAZO DYESTUFFS

Hans-Rudolf Byland, Riehen, near Basel, Switzerland, assignor, by mesne assignments, to Saul & Co., Newark, N. J., as nominee of Fidelity Union Trust Company, executive trustee under Sandoz Trust No Drawing. Application February 28, 1955,
Serial No. 491,202

Claims priority, application Switzerland March 5, 1954

6 Claims. (Cl. 260—145)

The present invention relates to metal-containing, especially copper- and nickel-containing polyazo dyestuffs which, in the metal-free form, correspond to the formula

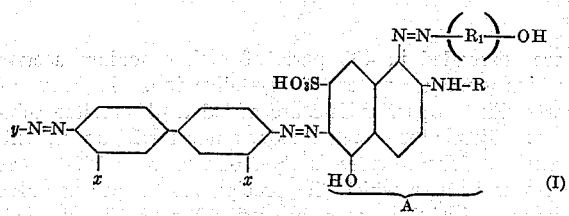

wherein $x$ stands for —OH, —OCH$_3$, —OC$_2$H$_5$ or —COOH, R stands for hydrogen or a radical of the aliphatic, alicyclic, araliphatic or aromatic series, R$_1$ stands for a mono- or binuclear radical of the benzene series, $y$ stands for the radical of an hydroxynaphthalene compound and is linked to the respective —N=N— group in ortho-position to the hydroxy group of said hydroxynaphthalene compound, radicals of the composition A being included, and wherein —OH adjacent to R$_1$ is located in ortho-position to the respective —N=N— group.

The aforesaid metal-containing polyazo dyestuffs are obtained by treating the metal-free polyazo dyestuffs of Formula I with metal-yielding agents. Suitable metal-yielding agents are for example copper compounds and nickel compounds. The coppering, for example, can be carried out in various ways as, for instance, by heating the dyestuffs with copper salts in weakly acid to alkaline medium, with or without the use of superatmospheric pressure, and/or in the presence of ammonia and/or organic bases or in a melt of alkali metal salts of low molecular aliphatic carboxylic acids. In the event the polyazo dyestuffs contain alkoxy groups which can form metal complexes, the metallization will result in the splitting off of such groups. The components from which the polyazo dyestuffs are built up are so selected that the metal complex compounds contain the requisite number of solubilizing groups, such for example as carboxyl, sulfonic acid, sulfonic acid amide and alkyl-sulfonyl groups, to assure the water-solubility of the metal-containing compounds. The nickel-containing dyestuffs are correspondingly prepared.

Metal-containing polyazo dyestuffs which are soluble in water, but the solubility of which does not exceed a certain limit, frequently possess particularly good affinity for cellulose fibers. On the other hand, this type of dyestuff, even if barely soluble in warm water, can also be readily employed for dyeing at temperatures above 100° C. under pressure.

Among the metal complex-forming groups $x$, the OH, OCH$_3$ and COOH groups are the most important. Since dealkylating metallization such as is here involved will, in the case of a —OCH$_2$.COOH group, result in the splitting off of the entire —CH$_2$COOH group, it is hardly practical to use polyazo dyestuffs which contain such groups.

The new metal-containing polyazo dyestuffs of the present invention are distinguished by their good tolerance to or compatibility with salt, and by the clear, deep navy blue shades of their dyeings on cotton and fibers of regenerated cellulose. The dyeings are dischargeable, of very good light fastness, and of good to very good fastness to washing and to water. Those dyeings are particularly fast which are aftertreated with polyalkylene-polyamine preparations which contain copper, e. g. in complex-bound form. In addition, the new dyestuffs reserve acetate silk and are also useful for printing and padding.

The following examples illustrate the invention by means of presently-preferred exemplary embodiments thereof. In such examples the parts are by weight, the percentages are by weight and the temperatures are in degrees centigrade.

Example 1

108.4 parts of the trisazo dyestuff which corresponds to the formula

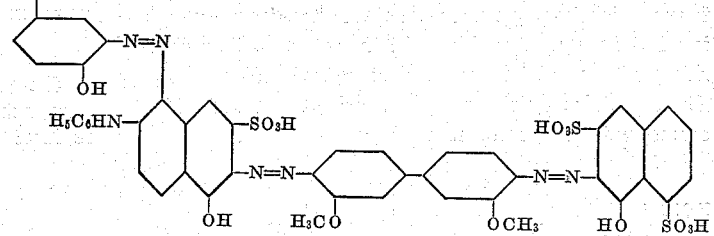

are suspended in 100 parts of pyridine, 15 parts of sodium carbonate and 50 parts of 25% aqueous ammonia in 2000 parts of water. The mixture is heated to 90°, whereby the dyestuff in part goes into solution. Thereupon, at 90° and in the course of a half hour, the solution of 76 parts of crystalline copper sulfate and 200 parts of 25% aqueous ammonia is added dropwise to the reaction mass. The mixture is boiled for 24 hours under reflux; in the course of this operation, the copper complex compound which is formed goes entirely into solution. The solution is then allowed to cool and the copper-containing trisazo dyestuff which corresponds to the formula

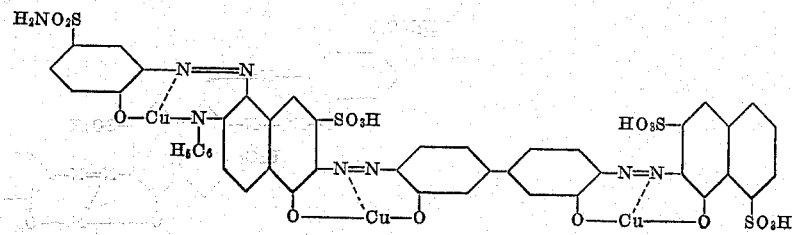

is salted out by the addition of 300 parts of sodium chloride. The dyestuff is filtered off and dried. It is a dark powder which dissolves with deep blue coloration in water and dyes cotton and fibers of regenerated cellulose in navy blue shades of remarkable fastness properties.

Example 2

108.4 parts of trisazo dyestuff, used as starting material in Example 1, are dissolved together with 100 parts of pyridine, 15 parts of sodium carbonate and 50 parts of 25% aqueous ammonia in 2000 parts of water. A solution of 79 parts of crystalline nickel sulfate ($NiSO_4.6H_2O$) and 400 parts of 25% aqueous ammonia are added to the resultant solution in the course of a half hour; the entire reaction mass is then boiled under reflux for 24 hours. Thereupon the solution is allowed to cool, the formed nickel complex compound of the trisazo dyestuff is salted out by the addition of 300 parts of sodium chloride, and the precipitated product filtered off and dried. The so-obtained nickel-containing trisazo dyestuff which corresponds to the formula

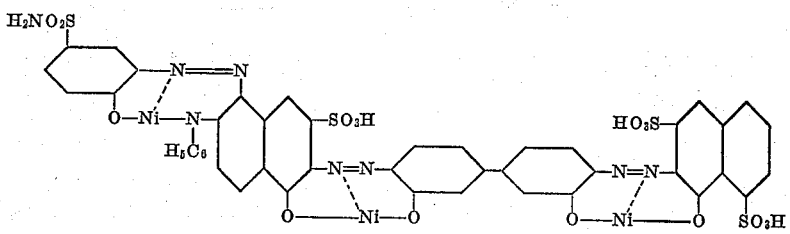

is a dark powder which dissolves with deep blue coloration in water and dyes cotton and fibers of regenerated cellulose in navy blue shades of remarkable fastness properties.

Example 3

105.6 parts of the trisazo dyestuff which corresponds to the formula

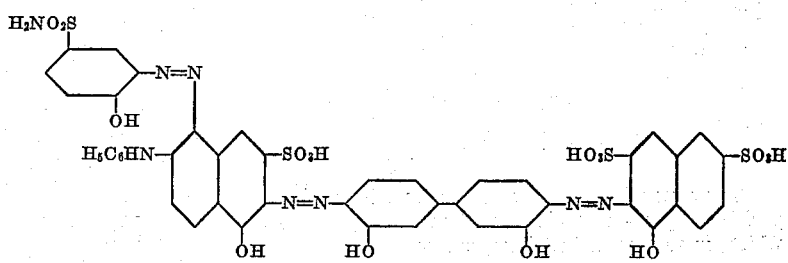

are suspended in 400 parts of molten sodium acetate which contains water of crystallization. 80 parts of crystalline copper sulfate are added to the molten mixture which is then heated under reflux for 24 hours, with stirring. The mixture is then diluted with 2000 parts of water, after which the precipitated copper complex compound of the trisazo dyestuff is filtered off and dried. The so-obtained copper-containing trisazo dyestuff corresponds to the formula

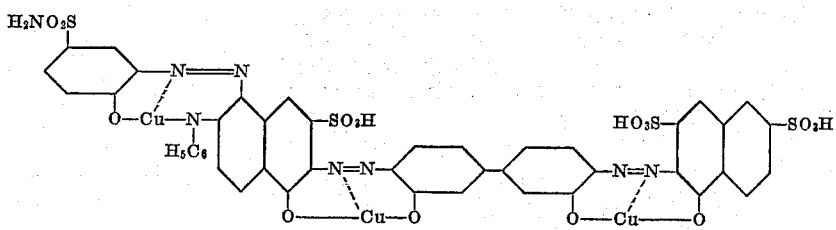

and possesses properties similar to those of the copper complex compound described in Example 1.

Example 4

The procedure according to Example 3 is followed except that the 80 parts of crystalline copper sulfate are replaced by 79 parts of crystalline nickel sulfate. There is thus obtained the corresponding nickel-containing trisazo dyestuff of the formula

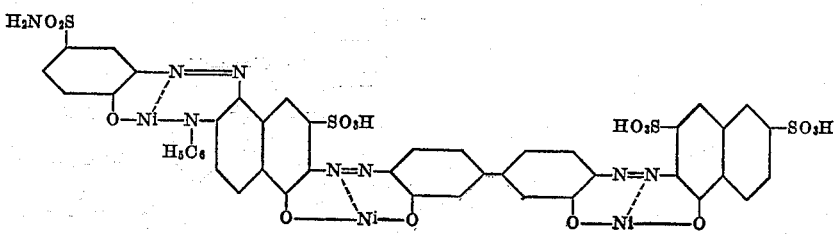

which has properties similar to those of the nickel complex compound described in Example 2.

The following table sets forth additional metal-containing polyazo dyestuffs which can be prepared according to the processes set forth in the preceding examples and which in the metal-free state correspond to the formula

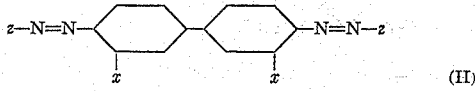

(II)

Column 2 of the table sets forth the significance of $x$; column 3 enumerates the monoazo compound which corresponds to one moiety $z$, namely that corresponding to moiety A of Formula I; and column 4 sets forth the second azo component corresponding to the other moiety $z$. Column 5 indicates the metal contained in the metal complex compound, and column 6 sets forth the shades of the dyeings obtained on cellulose fibers with the metal-containing polyazo dyestuffs.

TABLE

| (1) | (2) | (3) Monoazo Compound Corresponding to Moiety A | | (4) | (5) | (6) |
|---|---|---|---|---|---|---|
| Example No. | $x$ | (a) R | (b) Moiety $\{R_1\}$ OH Derived From— | Second Azo Component | Metal | Shade of Dyeing on Cellulose Fibers |
| 5 | —OCH₃ | —C₆H₅ | 1-amino-2-hydroxy-5-methylsulfonylbenzene. | 1-hydroxynaphthalene-3,6-disulfonic acid. | Cu | Navy blue. |
| 6 | —OCH₃ | —C₆H₅ | 1-amino-2-hydroxy-5-ethylsulfonylbenzene. | 1-acetylamino-8-hydroxynaphthalene-3,6-disulfonic acid. | Cu | Do. |
| 7 | —OCH₃ | —C₆H₅ | 1-amino-2-hydroxybenzene-5-sulfonic acid amide. | 2-hydroxynaphthalene-3,6-disulfonic acid. | Cu | Do. |
| 8 | —OC₂H₅ | —C₆H₅ | 1-amino-2-hydroxybenzene-5-sulfonic acid-phenylamide. | 1-hydroxynaphthalene-3,6,8-trisulfonic acid. | Cu | Do. |
| 9 | —OC₂H₅ | —C₆H₅ | 1-amino-2-hydroxybenzene-5-sulfonic acid-(2'-hydroxy)-ethylamide. | 2-phenylamino-5-hydroxynaphthalene-7,4'-disulfonic acid. | Cu | Do. |
| 10 | —OCH₃ | —C₆H₄·SO₃H | 1-amino-2-hydroxybenzene-5-sulfonic acid methylamide. | 2-hydroxynaphthalene-4-sulfonic acid. | Cu | Do. |
| 11 | —OCH₃ | —C₆H₄·SO₃H | 1-amino-2-hydroxybenzene-5-sulfonic acid morpholide. | 1-acetylamino-8-hydroxy-naphthalene-4-sulfonic acid. | Cu | Do. |
| 12 | —OCH₃ | —C₆H₄·SO₃H | 1-amino-2-hydroxybenzene-4-sulfonic acid amide. | 2-(4'-carboxyl)-phenylamino-8-hydroxynaphthalene-6-sulfonic acid. | Cu | Do. |
| 13 | —OCH₃ | —C₆H₄·CH₃ | 1-amino-2-hydroxybenzene-5-sulfonic acid amide. | 1,8-dihydroxynaphthalene-3,6-disulfonic acid. | Cu | Do. |
| 14 | —OCH₃ | —C₆H₄·Cl | 1-amino-2-hydroxybenzene-5-sulfonic acid. | 1-hydroxynaphthalene-4-sulfonic acid. | Cu | Do. |
| 15 | —OCH₃ | —C₆H₅ | 1-amino-2-hydroxy-5-nitrobenzene. | 1-hydroxynaphthalene-3,6-disulfonic acid. | Cu | Do. |
| 16 | —OCH₃ | —H | 1-amino-2-hydroxy-5-chlorobenzene. | 1-hydroxynaphthalene-3,8-disulfonic acid. | Cu | Do. |
| 17 | —OCH₃ | —C₆H₅ | 1-amino-2-hydroxybenzene-5-sulfonic acid-(4'-methyl)-phenylamide. | ......do...... | Cu | Do. |
| 18 | —OCH₃ | —C₆H₅ | 1-amino-2-hydroxybenzene-5-sulfonic acid methylamide. | 1-hydroxynaphthalene-3,6-disulfonic acid. | Cu | Do. |
| 19 | —OH | —C₆H₄·SO₃H | 1-amino-2-hydroxybenzene-4-sulfonic acid methylamide. | 1-hydroxynaphthalene-4-sulfonic acid. | Cu | Do. |
| 20 | —OCH₃ | —C₆H₄·SO₃H | 1-amino-2-hydroxybenzene-5-sulfonic acid methylamide. | 1-(2'-hydroxy-5'-sulfamido)-phenylazo-2-(4'-sulfo)-phenylamino-5-hydroxynaphthalene-7-sulfonic acid. | Cu | Do. |
| 21 | —COOH | —C₆H₄·SO₃H | ......do...... | ......do...... | Cu | Do. |
| 22 | —COOH | —C₆H₄·SO₃H | 1-amino-2-hydroxy-5-methylsulfonylbenzene. | ......do...... | Cu | Do. |
| 23 | —OCH₃ | —C₆H₅ | ......do...... | 2-(4'-carboxy)-phenylamino-8-hydroxynaphthalene-6-sulfonic acid. | Cu | Do. |
| 24 | —OCH₃ | —C₆H₅ | 1-amino-2-hydroxybenzene-5-sulfonic acid-(3'-methoxy)-propylamide. | 1-hydroxynaphthalene-3,6-disulfonic acid. | Cu | Do. |
| 25 | —OCH₃ | —C₆H₅ | 1-amino-2-hydroxybenzene-5-sulfonic acid-(2'-hydroxy)-propylamide. | ......do...... | Cu | Do. |
| 26 | —OH | —C₆H₄·SO₃H | 1-amino-2-hydroxybenzene-4-sulfonic acid-(2'-hydroxy)-propylamide. | 1-[2'-hydroxy-4'-sulfo-(2''-hydroxy)-propylamido]-phenylazo-2-(4'-sulfo)-phenylamino-5-hydroxynaphthalene-7-sulfonic acid. | Cu | Do. |
| 27 | —OH | —C₆H₅ | ......do...... | 1-hydroxynaphthalene-3,6,8-trisulfonic acid. | Cu | Do. |
| 28 | —OCH₃ | —C₆H₄·SO₂NH₂ | 1-amino-2-hydroxybenzene-5-sulfonic acid-(2'-hydroxy)-propylamide. | 1-[2'-hydroxy-5'-sulfo-(2''-hydroxy)-propylamido]-phenylazo-2-(4'-sulfo)-phenylamino-5-hydroxynaphthalene-7-sulfonic acid. | Cu | Do. |
| 29 | —OCH₃ | —C₆H₄·SO₃H | 1-amino-2-hydroxy-5-nitrobenzene. | 1-(2'-hydroxy-5'-sulfamido)-phenylazo-2-(4'-sulfo)-phenylamino-5-hydroxynaphthalene-7-sulfonic acid. | Ni | Do. |
| 30 | —OCH₃ | —C₆H₄·SO₃H | 1-amino-2-hydroxy-4-nitrobenzene. | 1-(2'-hydroxy-4'-nitro)-phenylazo-2-(4'-sulfo)-phenylamino-5-hydroxynaphthalene-7-sulfonic acid. | Cu | Do. |
| 31 | —OCH₃ | —C₆H₁₁ | 1-amino-2-hydroxybenzene-5-sulfonic acid amide. | 1-hydroxynaphthalene-3,6-disulfonic acid. | Cu | Do. |
| 32 | —OCH₃ | —C₆H₁₃ | ......do...... | ......do...... | Cu | Do. |
| 33 | —OCH₃ | —CH₂·C₆H₅ | ......do...... | ......do...... | Cu | Do. |
| 34 | —OCH₃ | —CH₂·C₆H₅ | ......do...... | 1-acetylamino-8-hydroxynaphthalene-3,6-disulfonic acid. | Ni | Do. |
| 35 | —OCH₃ | —C₆H₁₁ | ......do...... | ......do...... | Cu | Do. |

Formulae of representative dyestuffs of the preceding table are as follows:

Example 18

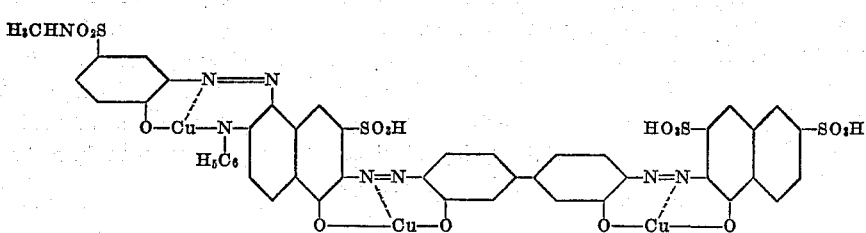

Example 20

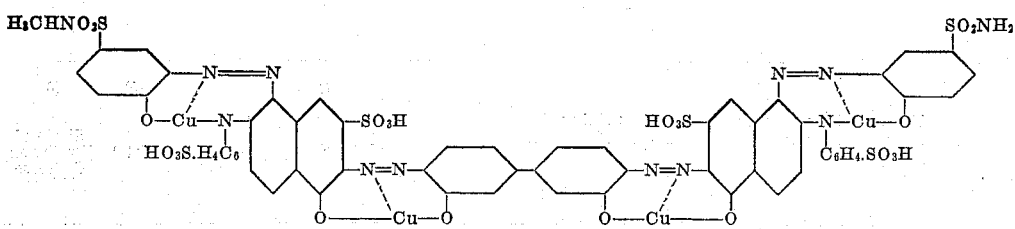

The polyazo dyestuffs which serve as starting materials are prepared, for example, by coupling one mol of the tetrazo compound of a 4,4'-diamino-1,1'-diphenyl of the formula

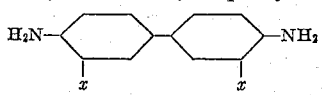

wherein $x$ has the precedingly-indicated significance, with two mols of an azo compound of the formula

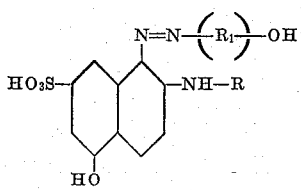

(III)

wherein R and $R_1$ have the precedingly-indicated significance, and wherein —OH adjacent to $R_1$ is located in ortho-position to the respective —N=N—group, or simultaneously or in any desired order of succession with one mol of an azo compound (III) as hereinbefore described and one mol of a different azo compound corresponding to the said Formula III, or in any desired order of succession with one mol of an azo compound (III) as initially defined and one mol of any other desired hydroxynaphthalene compound coupling ortho-position to the hydroxy group.

Example 36

100 parts of cotton which have been prewetted in hot water, are entered at 40° into a dyebath which contains a solution of 1.5 parts of the copper-containing polyazo dyestuff, prepared according to Example 1, and 10 parts of Glauber's salt in 3000 parts of softened water. The bath is heated to 100° in the course of about 30 minutes, 20 additional parts of Glauber's salt being added portionwise, and the dyeing process is continued for 15 minutes at 100°, at the end of which time 10 more parts of Glauber's salt are added. The bath is then allowed to cool to about 50° in the course of 15–20 minutes, after which the dyed cotton is withdrawn, rinsed and dried.

Fibers of regenerated cellulose are dyed in the same way.

Example 37

15 parts of the copper-containing polyazo dyestuff described in Example 1 are heated to boiling together with 100 parts of urea and 45 parts of triethanolamine in 360 parts of water. 400 parts of gum tragacanth (6%), 20 parts of sodium phosphate, 40 parts of an anion-active wetting agent and 10 parts of an anti-foaming agent are added to the solution, and the so-formed printing paste is printed onto a fabric of viscose silk. The print is then dried, steamed for 45–60 minutes and rinsed. After a 15 minute aftertreatment with one gram per liter of a copper salt-containing polyalkylene-polyamine preparation at 60°, the print is again rinsed and dried.

Example 38

22.5 parts of the copper-containing trisazo dyestuff obtained according to Example 1 are dissolved in 1000 parts of boiling distilled water. The solution is allowed to cool and is then applied in the cooled state by means of a Foulard onto cotton fabric. After expressing 80% of the solution (relative to the weight of the cotton), a navy blue dyeing is obtained. In order to fix the so-applied dyestuff, the dyed cotton is subjected to a treatment in a steam bath or in a hot salt bath, for example a bath containing 20 grams of sodium chloride per liter. The dyed material is thereafter rinsed and dried.

What is claimed is:

1. A metal-containing polyazo dyestuff wherein the metal is selected from the class consisting of nickel and copper, and which, in the metal-free state, corresponds to the formula

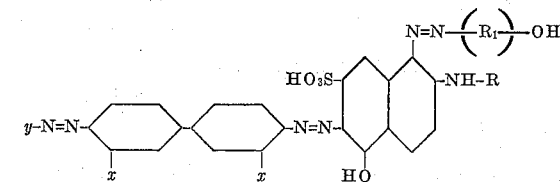

wherein $x$ stands for a member selected from the group consisting of —OH, —OCH$_3$, —OC$_2$H$_5$ and —COOH, R stands for a member selected from the group consisting of hydrogen, lower alkyl, cyclohexyl, benzyl and mononuclear carbocyclic aryl, $R_1$ stands for a member selected from the group consisting of mononuclear and binuclear radicals of the benzene series, $y$ stands for the radical of an hydroxynaphthalene compound and is linked to the adjacent —N=N— group in ortho-position to the hydroxy group of said hydroxynaphthalene compound, and wherein —OH adjacent to $R_1$ is located in ortho-position to the adjacent —N=N— group.

2. The copper complex compound which corresponds to the formula

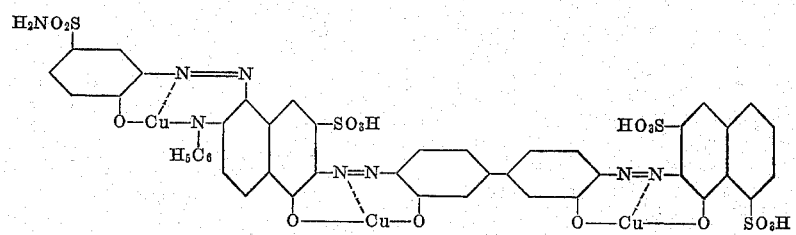

3. The nickel complex compound which corresponds to the formula

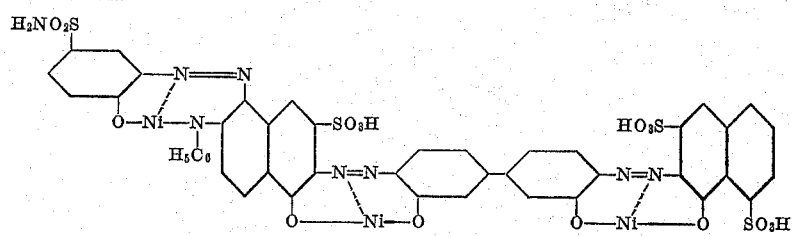

4. The copper complex compound which corresponds to the formula

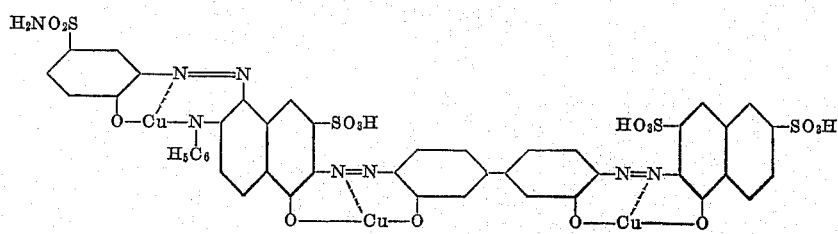

5. The copper complex compound which corresponds to the formula

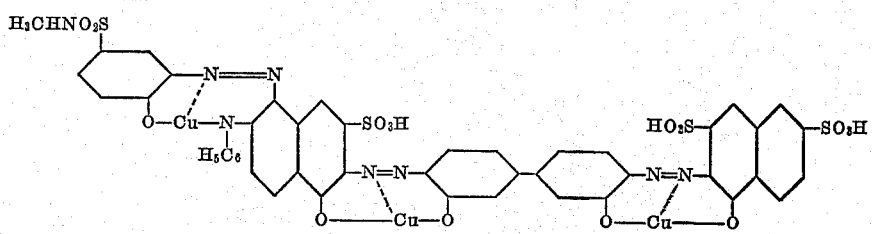

6. The copper complex compound which corresponds to the formula

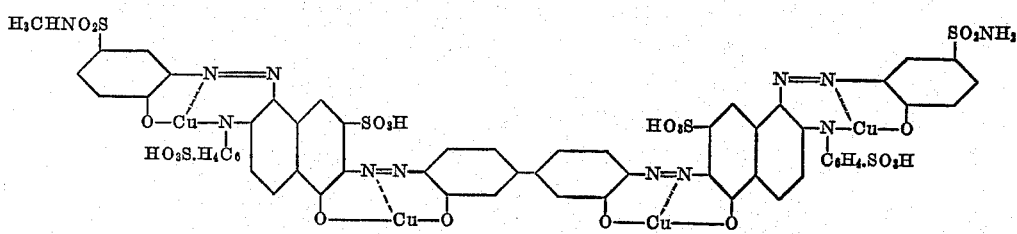

References Cited in the file of this patent
UNITED STATES PATENTS
2,638,468    Wehrli _____ May 12, 1953